(12) United States Patent
Isayama et al.

(10) Patent No.: US 7,758,075 B2
(45) Date of Patent: Jul. 20, 2010

(54) SUPPORTING STRUCTURE FOR FUEL TANK AND AUTOMOBILE ASSEMBLING METHOD

(75) Inventors: Akira Isayama, Wako (JP); Yasunori Oku, Wako (JP); Nobuo Kubo, Wako (JP); Takuya Yanagida, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 512 days.

(21) Appl. No.: 11/705,236

(22) Filed: Feb. 12, 2007

(65) Prior Publication Data

US 2007/0246929 A1 Oct. 25, 2007

(30) Foreign Application Priority Data

Apr. 19, 2006 (JP) ............................. 2006-115672

(51) Int. Cl.
*B60P 3/22* (2006.01)
(52) U.S. Cl. .................... 280/834; 280/831; 280/830; 280/124.109
(58) Field of Classification Search .............. 280/834, 280/831, 830, 124.109
See application file for complete search history.

(56) References Cited

U.S. PATENT DOCUMENTS

| | | | | |
|---|---|---|---|---|
| 5,560,651 | A | * | 10/1996 | Kami et al. ................. 280/788 |
| 5,992,885 | A | * | 11/1999 | Fukagawa et al. ........... 280/830 |
| 6,086,103 | A | * | 7/2000 | Fukagawa et al. ........... 280/830 |
| 6,457,729 | B2 | * | 10/2002 | Stenvall ............... 280/124.134 |
| 2003/0047932 | A1 | * | 3/2003 | Kawazu et al. .............. 280/830 |
| 2004/0239095 | A1 | * | 12/2004 | Wozniak et al. ............. 280/834 |
| 2005/0161935 | A1 | * | 7/2005 | Ono et al. .................... 280/834 |
| 2006/0289224 | A1 | * | 12/2006 | Ono et al. .................... 180/311 |

FOREIGN PATENT DOCUMENTS

| | | |
|---|---|---|
| JP | 06-286484 | 10/1994 |
| JP | 2000-255448 | 9/2000 |

* cited by examiner

*Primary Examiner*—Lesley Morris
*Assistant Examiner*—Marlon A Arce
(74) *Attorney, Agent, or Firm*—Carrier, Blackman & Associates, P.C.; William D. Blackman; Joseph P. Carrier

(57) ABSTRACT

A supporting structure for a fuel tank in a vehicle includes a suspension arm fixing structure provided under the floor of a vehicle body and having a statically sufficient rigidity, the fuel tank being located so as to partially overlap the suspension arm fixing structure in the longitudinal direction of the vehicle, and a supporting member provided under the fuel tank so as to extend in the lateral direction of the vehicle being detachably fastened to the suspension arm fixing structure to bring the fuel tank into pressure contact with the floor of the vehicle body by fixing the fuel tank. The supporting member serves also as a reinforcing member for imparting rigidity to the suspension arm fixing structure so that the suspension arm fixing structure can sufficiently sustain a dynamic load during running of the vehicle.

4 Claims, 13 Drawing Sheets

SUPPORTING STRUCTURE FOR FUEL TANK AND AUTOMOBILE ASSEMBLING METHOD

BACKGROUND OF THE INVENTION

1. Field of the Invention

The present invention relates to a supporting structure for a fuel tank mounted on a vehicle and an automobile assembling method for mounting the fuel tank.

2. Description of the Related Art

Generally, a fuel tank in a vehicle is located under a rear seat, and such a layout is adopted in various types of vehicles. For example, Japanese Patent Laid-open No. Hei 6-286484 discloses a supporting structure for a fuel tank such that the fuel tank is mounted to a subframe to subassemble a rear suspension module, which is in turn mounted to a main frame. The supporting structure disclosed in this publication is intended to increase a substantial capacity of the fuel tank by setting the mounting position of a breather pipe with respect to the fuel tank to a high position. The fuel tank is supported by the subframe under the rear seat.

Further, Japanese Patent Laid-open No. 2000-255448 discloses a rear subframe structure for a vehicle such that saving of the installation space for a rear subframe and improvement in rigidity of supporting of a differential unit are intended. In this rear subframe structure, a fuel tank is reduced in thickness at its central portion so as to avoid the interference with a propeller shaft, so that the fuel tank is composed of a right tank portion and a left tank portion and located on the front side of the rear subframe under the rear seat.

There is a desire such that the flexibility of arrangement of suspension arms is to be improved for the purposes of improvement in rear suspension performance. However, the above-mentioned arrangement in the related art has a problem such that the tank capacity of the fuel tank cannot be ensured and the fuel tank is located at a position where the volumetric efficiency is low, causing an increase in weight of the fuel tank and an adverse effect on the cabin comfort of the vehicle. If the tank capacity of the fuel tank is intended to be ensured with a high volumetric efficiency, it is difficult to ensure the rigidity of the subframe for supporting the suspension arms or the rigidity of suspension arm mounting points on a vehicle body.

SUMMARY OF THE INVENTION

It is therefore an object of the present invention to provide a supporting structure for a fuel tank which can sufficiently ensure the tank capacity of the fuel tank without reducing the rigidity of a subframe.

In accordance with an aspect of the present invention, there is provided a supporting structure for a fuel tank in a vehicle including a suspension arm fixing structure provided under the floor of a vehicle body and having a statically sufficient rigidity; a fuel tank located so as to partially overlap the suspension arm fixing structure in the longitudinal direction of the vehicle; and a supporting member provided under the fuel tank so as to extend in the lateral direction of the vehicle, the supporting member being detachably fastened to the suspension arm fixing structure to bring the fuel tank into pressure contact with the floor of the vehicle body by fixing the fuel tank; the supporting member serving also as a reinforcing member for imparting rigidity to the suspension arm fixing structure so that the suspension arm fixing structure can sufficiently sustain a dynamic load during running of the vehicle.

With this arrangment, the supporting member for supporting the fuel tank serves also as a reinforcing member for imparting rigidity to the suspension arm fixing structure. Accordingly, the supporting structure for the fuel tank can be rationalized, and the tank capacity can be efficiently ensured without any adverse effect on the cabin comfort of the vehicle. Further, the flexibility of arrangement of rear suspension arms can be improved, so that the improvement in rear suspension performance can be expected.

In accordance with another aspect of the present invention, there is provided a supporting structure for a fuel tank in a vehicle including a suspension arm fixing structure provided under the floor of a vehicle body and having a statically sufficient rigidity; a fuel tank located so as to partially overlap the suspension arm fixing structure in the longitudinal direction of the vehicle; and a supporting member provided under the fuel tank so as to extend in the lateral direction of the vehicle, the supporting member being detachably fastened to the suspension arm fixing structure to hold the fuel tank in cooperation with a part of the suspension arm fixing structure; the supporting member serving also as a reinforcing member for imparting rigidity to the suspension arm fixing structure so that the suspension arm fixing structure can sufficiently sustain a dynamic load during running of the vehicle.

Preferably, the suspension arm fixing structure includes a subframe formed independently of the vehicle body. Preferably, the supporting structure further includes a tank band capable of fixing the fuel tank to the vehicle body statically.

More preferably, the suspension arm fixing structure includes a subframe formed independently of the vehicle body; the subframe overlapping the fuel tank over at least the half of the length in the longitudinal direction of the vehicle; the supporting structure further including a second supporting member detachably fastened to the subframe for securely supporting the fuel tank.

In accordance with a further aspect of the present invention, there is provided an automobile assembling method including the steps of mounting suspension arms, wheel hubs, and brakes to a subframe to subassemble a suspension module; mounting the suspension module to a vehicle body; mounting a fuel tank to the suspension module so that the fuel tank partially overlaps the suspension module in the longitudinal direction of the vehicle; and locating a supporting member extending in the lateral direction of the vehicle under the fuel tank and fastening the supporting member to the suspension module.

According to this automobile assembling method, the fuel tank is mounted to the suspension module already mounted to the vehicle body, so that the mountability of the fuel tank can be improved.

In accordance with a still further aspect of the present invention, there is provided an automobile assembling method including the steps of mounting a fuel tank to a subframe so that the fuel tank partially overlaps the subframe in the longitudinal direction of the vehicle; fastening a supporting member to the subframe from the underside of the fuel tank to subassemble a subframe module having the fuel tank; and mounting the subframe module to a vehicle body.

The above and other objects, features and advantages of the present invention and the manner of realizing them will become more apparent, and the invention itself will best be understood from a study of the following description and appended claims with reference to the attached drawings showing some preferred embodiments of the invention.

DESCRIPTION OF THE PREFERRED EMBODIMENTS

Figure 1:
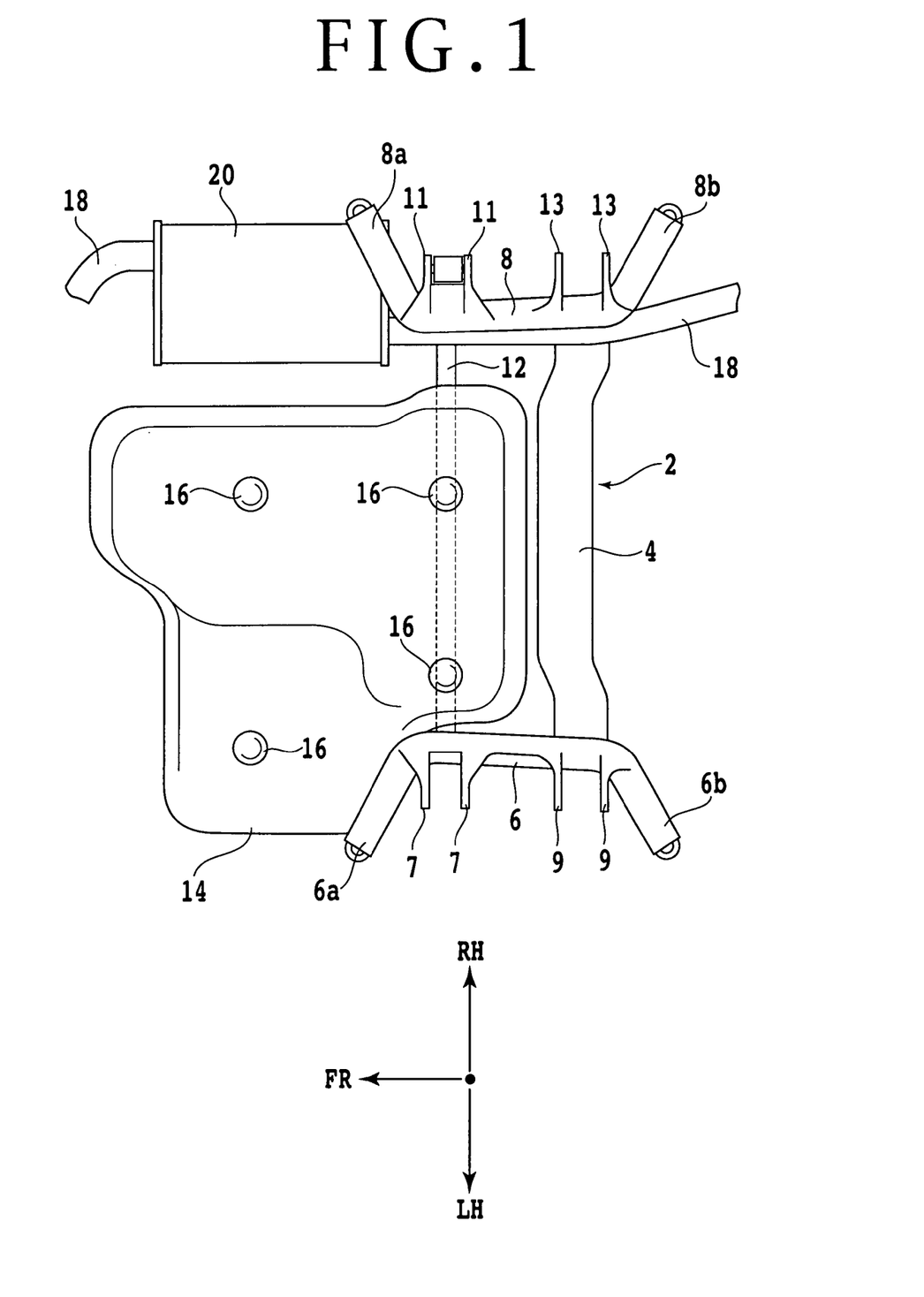
FIG. 1 is a top plan view of a supporting structure for a fuel tank according to a first preferred embodiment of the present invention.
Figure 2:
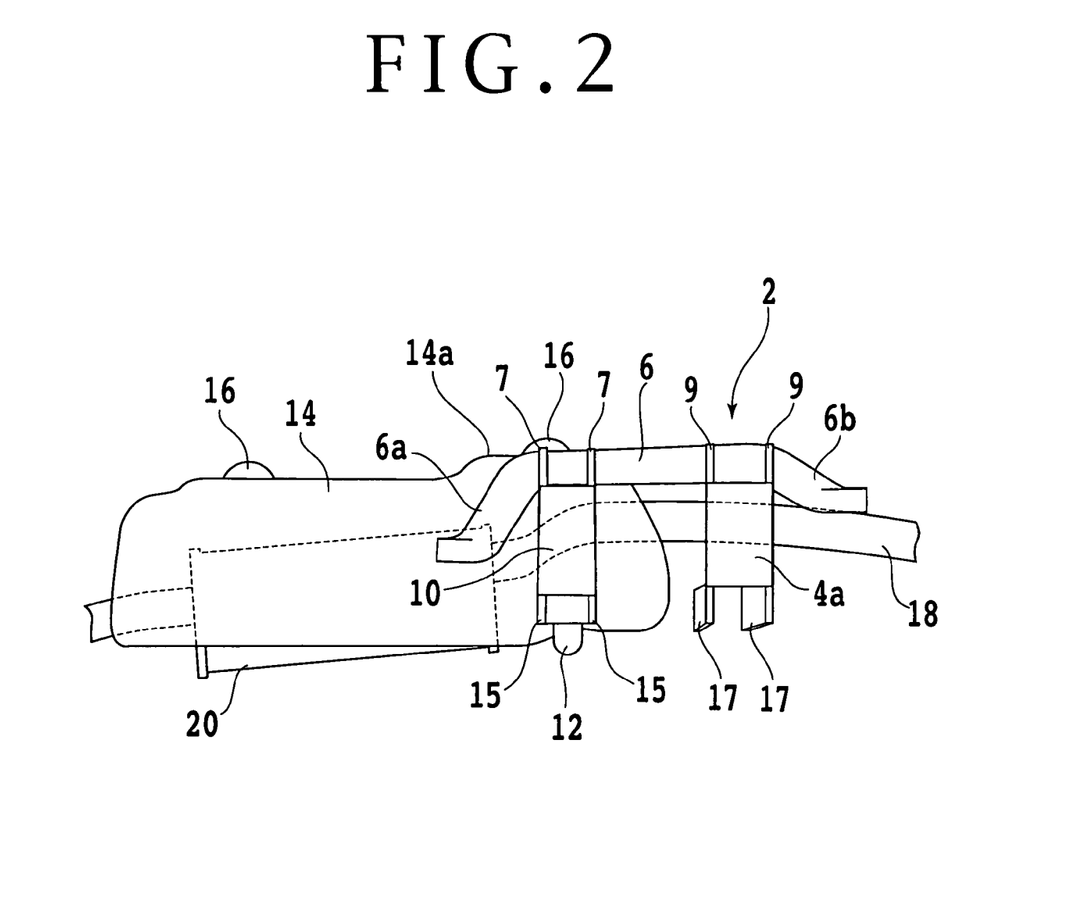
FIG. 2 is a left side elevation of the supporting structure according to the first preferred embodiment.
Figure 3:
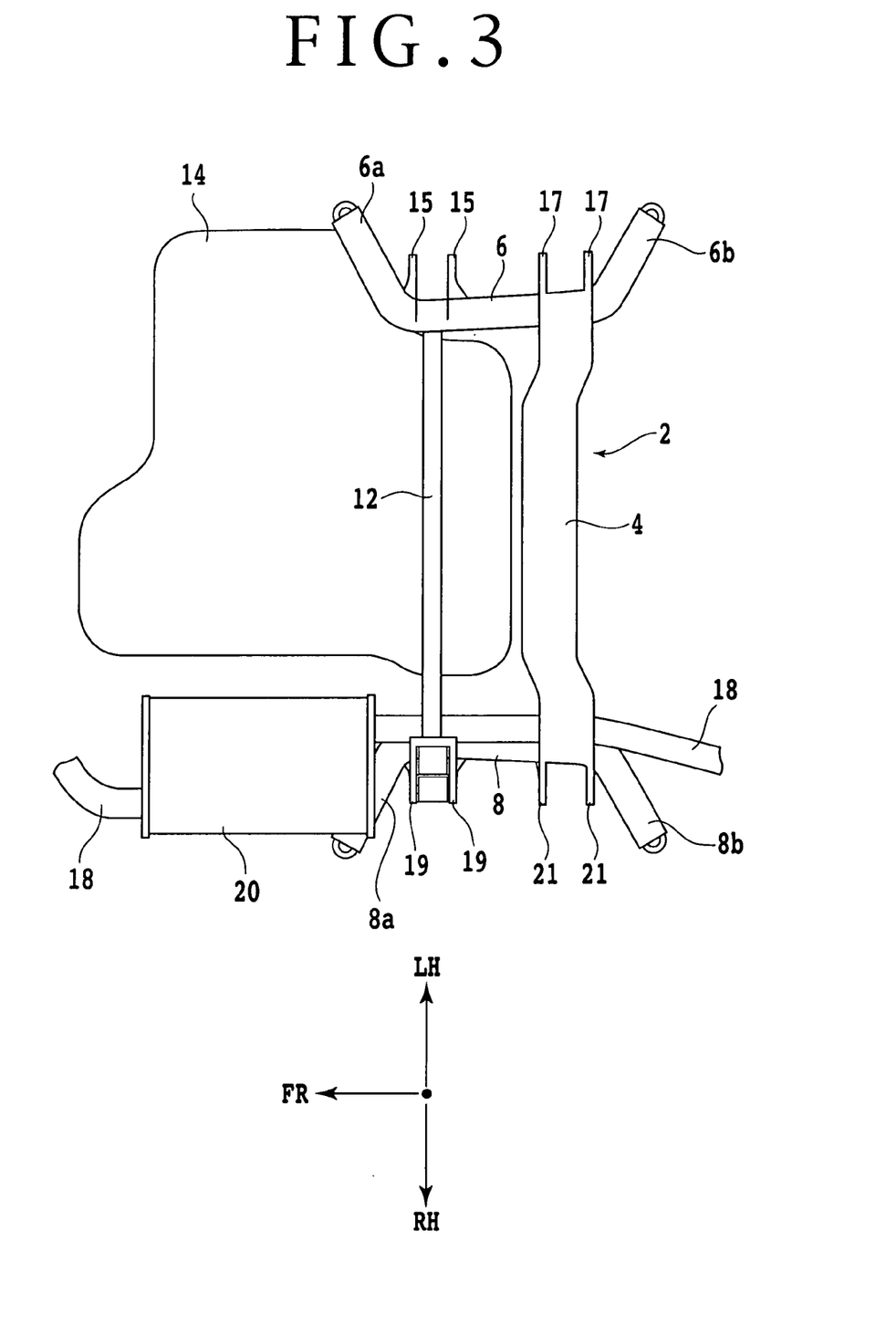
FIG. 3 is a bottom plan view of the supporting structure according to the first preferred embodiment.

Some preferred embodiments of the present invention will now be described in detail with reference to the drawings. Referring first to FIGS. 1 to 4, there is shown a supporting structure for a fuel tank according to a first preferred embodiment of the present invention. FIG. 1 is a top plan view of the supporting structure, FIG. 2 is a left side elevation of the supporting structure, and FIG. 3 is a bottom plan view of the supporting structure. In FIGS. 1 and 3, FR, RH, and LH denote front, right, and left sides of a vehicle on which the fuel tank is mounted, respectively.

Reference symbol 2 generally denotes a subframe. The subframe 2 is composed of a lateral member 4 extending in the lateral direction of the vehicle and a pair of longitudinal members 6 and 8 extending in the longitudinal direction of the vehicle. The lateral member 4 and the longitudinal members 6 and 8 are integrally connected with each other. The longitudinal member 6 has opposite end portions 6a and 6b extending laterally outward and obliquely downward. Similarly, the longitudinal member 8 has opposite end portions 8a and 8b extending laterally outward and obliquely downward. The longitudinal member 6 is integrally formed with a pair of brackets 7 and 9 for fixing a left upper arm of a rear suspension (not shown). Similarly, the longitudinal member 8 is integrally formed with a pair of brackets 11 and 13 for fixing a right upper arm of the rear suspension.

As apparent from FIG. 2, the lateral member 4 has one end portion 4a vertically extending, and the one end portion 4a is integrally formed with a bracket 17 for fixing a left lower arm of the rear suspension. A vertical member 10 is integrally mounted on the longitudinal member 6, and the vertical member 10 is integrally formed at its lower end with a bracket 15 for fixing the left lower arm.

Figure 4:
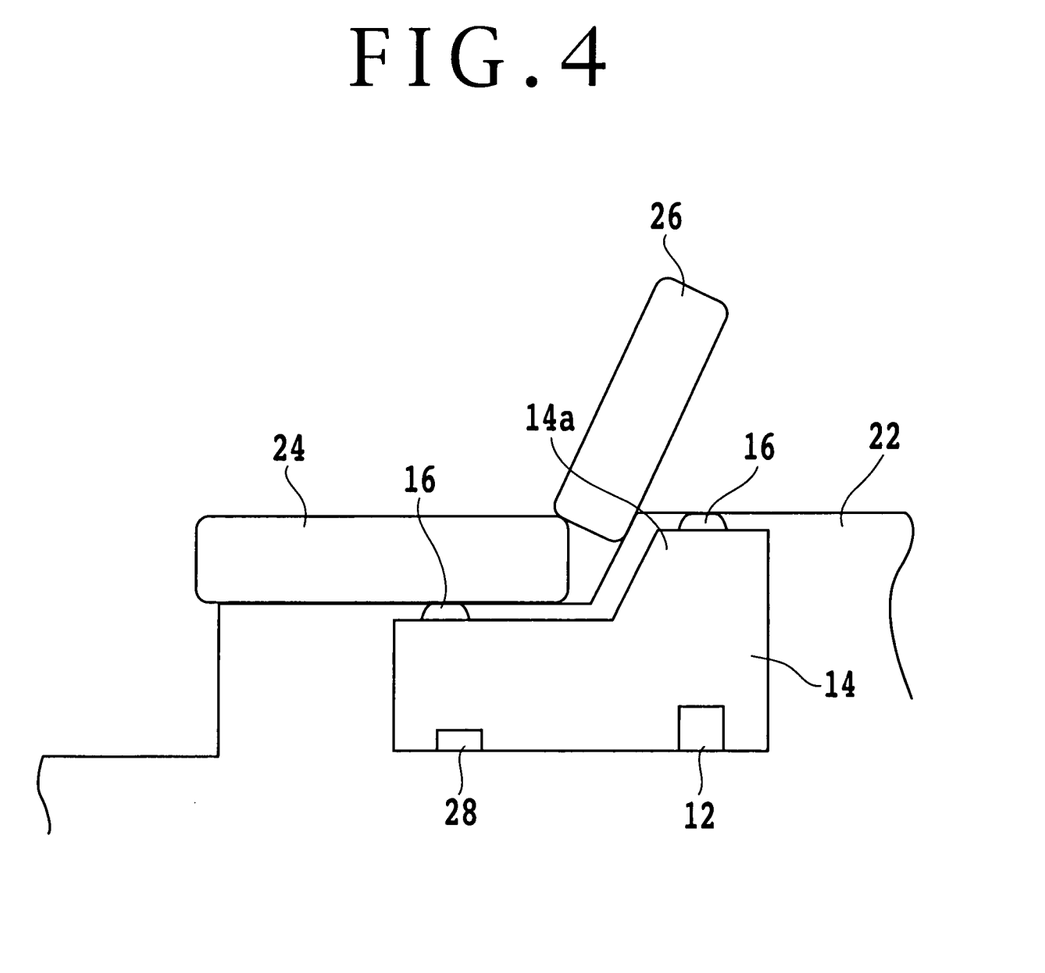
FIG. 4 is a schematic side view showing the positional relation between a rear seat and a fuel tank in the first preferred embodiment.

As shown in FIG. 3, the other vertically extending end portion of the lateral member 4 is also integrally formed with a bracket 21 for fixing a right lower arm of the rear suspension. Further, a vertical member integral with the longitudinal member 8 is integrally formed at its lower end with a bracket 19 for fixing the right lower arm. Reference symbol 12 denotes a supporting member detachably fastened at its opposite ends to the vertical member 10 of the longitudinal member 6 and the vertical member of the longitudinal member 8. The supporting member 12 serves mainly as a member for supporting a fuel tank 14. The fuel tank 14 is mounted so as to partially overlap the subframe 2 in the longitudinal direction of the vehicle. The fuel tank 14 is formed of synthetic resin, for example, and it has a volume expanded portion 14a as shown in FIGS. 2 and 4.

As apparent from FIG. 1, the upper surface of the fuel tank 14 is integrally formed with four projections 16. As schematically shown in FIG. 4, the projections 16 of the fuel tank 14 are brought into pressure contact with the floor 22 of a vehicle body from the underside thereof when the supporting member 12 is detachably fastened to the subframe 2. In FIG. 4, reference symbol 24 denotes a seat cushion of a rear seat, and reference symbol 26 denotes a seat back of the rear seat. Reference symbol 28 denotes a tank band for securely supporting a front end portion of the fuel tank 14 to the vehicle body.

Reference symbol 18 denotes an exhaust pipe. The exhaust pipe 18 is formed with an expansion chamber 20. In the middle of the exhaust pipe 18 is located so as not to interfere with the subframe 2 and the fuel tank 14. The subframe 2 has a statically sufficient rigidity. When the supporting member 12 is fastened to the subframe 2, the supporting member 12 serves to securely support the fuel tank 14 and serves also as a reinforcing member for imparting rigidity to the subframe 2 so that the subframe 2 can sufficiently sustain a dynamic load during running of the vehicle. In the case of removing the fuel tank 14 for repair of replacement because of damage or the like, the fuel tank 14 can be easily removed by removing the supporting member 12 from the subframe 2.

According to this preferred embodiment, the supporting member 12 for supporting the fuel tank 14 serves also as a reinforcing member for imparting rigidity to the subframe 2. Accordingly, the structure of the subframe 2 can be rationalized and a part of the fuel tank 14 can be located so as not to interfere with the rear seat without any adverse effect on the cabin comfort of the vehicle, so that the tank capacity of the fuel tank 14 can be sufficiently ensured.

Further, the efficiency of constraining the fuel tank 14 can be improved to thereby reduce the number of tank bands from two to one as in this preferred embodiment. Moreover, since the fuel tank 14 is supported by the supporting member 12 having a high rigidity, the accuracy of mounting position of the fuel tank 14 can be improved. As a modification of this preferred embodiment, the subframe 2 for fixing the suspension arms may not be used, but fixing portions for fixing the suspension arms may be directly formed on the vehicle body.

Figure 5:
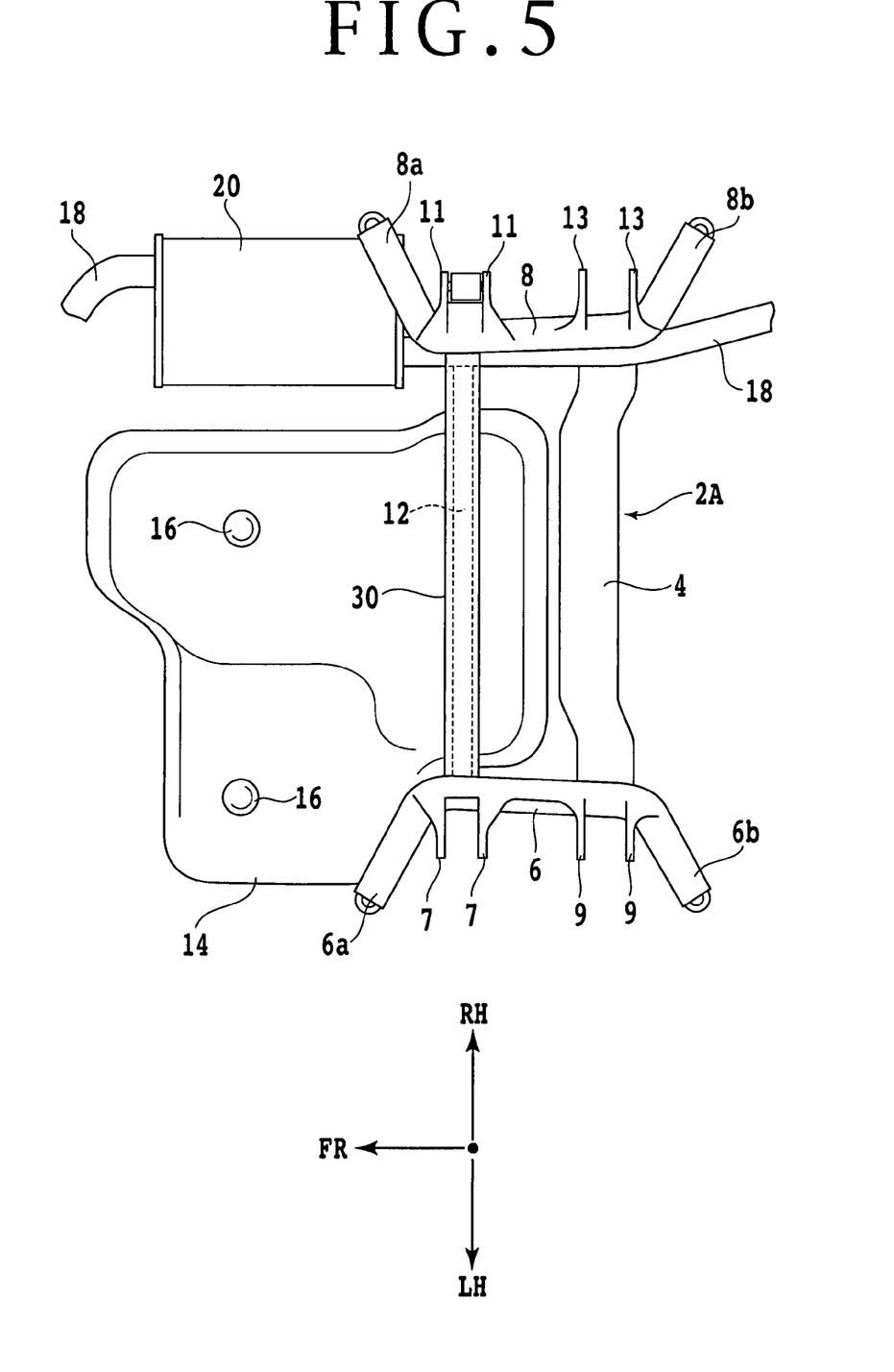
FIG. 5 is a top plan view of a supporting structure for a fuel tank according to a second preferred embodiment of the present invention.
Figure 6:
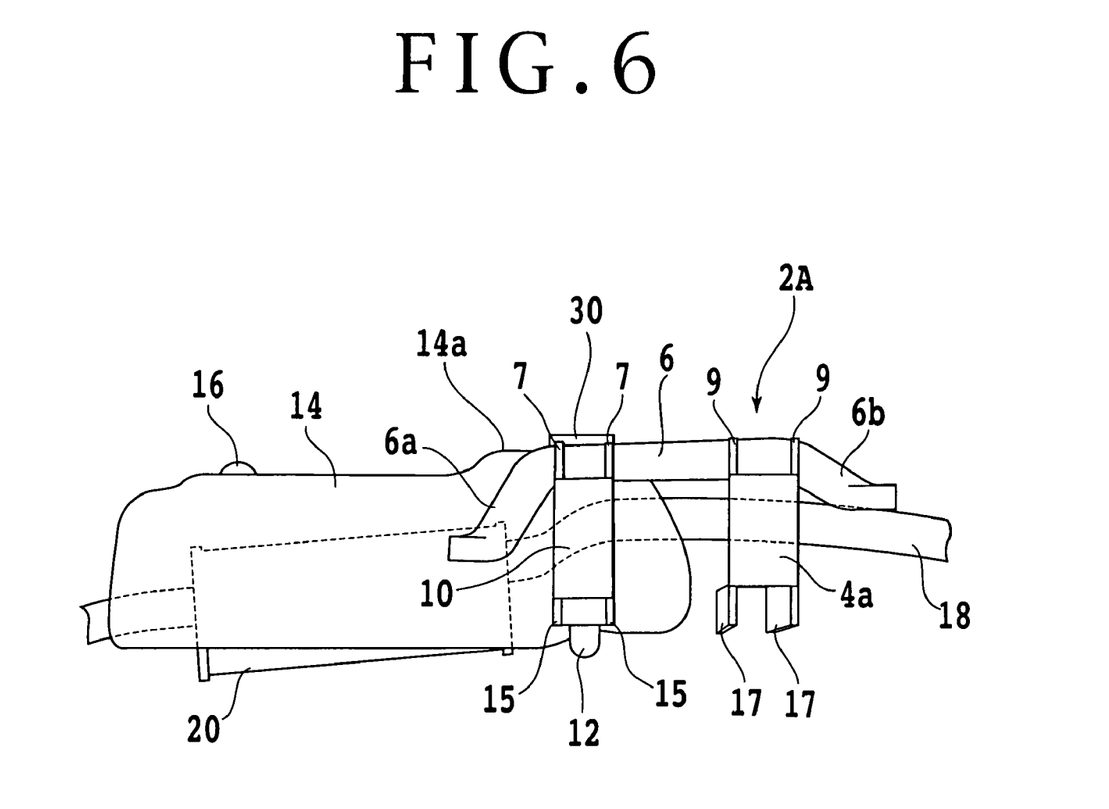
FIG. 6 is a left side elevation of the supporting structure according to the second preferred embodiment.
Figure 7:
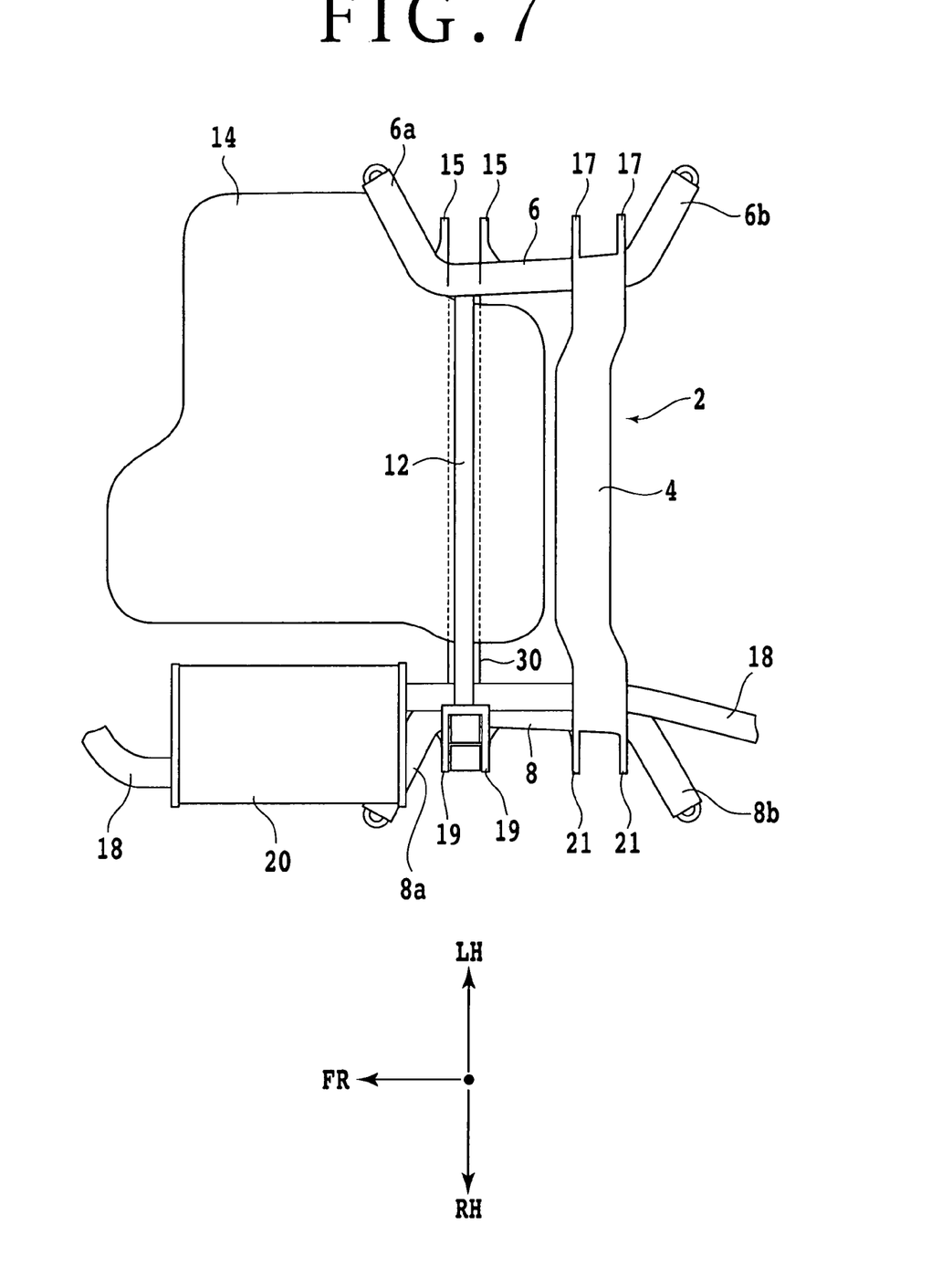
FIG. 7 is a bottom plan view of the supporting structure according to the second preferred embodiment.

Referring next to FIGS. 5 to 7, there is shown a supporting structure for a fuel tank according to a second preferred embodiment of the present invention. The second preferred embodiment is similar to the first preferred embodiment mentioned above, and the same parts as those of the first preferred embodiment are denoted by the same reference symbols, so the description thereof will be omitted herein to avoid repetition. The second preferred embodiment is different from the first preferred embodiment in only the point that a subframe 2A according to the second preferred embodiment has a front lateral member 30 for holding the upper surface of the fuel tank 14. The front lateral member 30 is integrally fixed at its opposite ends to a pair of longitudinal members 6 and 8.

In the supporting structure for the fuel tank 14 according to the second preferred embodiment, the fuel tank 14 is held between the front lateral member 30 on the upper side of the fuel tank 14 and the supporting member 12 on the lower side of the fuel tank 14 as shown in FIG. 6. Accordingly, the fuel tank 14 is supported at its rear end portion to the subframe 2A in a floating manner with respect to the vehicle body. Also in this preferred embodiment, the front end portion of the fuel tank 14 is securely supported to the vehicle body by a tank band (not shown). The second preferred embodiment can exhibit meritorious effects similar to those of the first preferred embodiment mentioned above.

As a method of assembling the supporting structure for the fuel tank 14 according to the first and second preferred embodiments, the following methods are preferred. As the first assembling method, suspension arms, wheel hubs, and brakes are mounted to the subframe 2 or 2A to subassemble a suspension module. Thereafter, the suspension module is mounted to the vehicle body. In the next step, the fuel tank 14 is mounted to the suspension module so as to partially overlap the same in the longitudinal direction of the vehicle. Thereafter, the supporting member 12 extending in the lateral direction of the vehicle is located under the fuel tank 14 and fastened to the suspension module.

In the second preferred embodiment, the following second assembling method is adoptable. In the first step of the second assembling method, the fuel tank 14 is mounted to the subframe 2A so as to partially overlap the same in the longitudinal direction of the vehicle. Thereafter, the supporting member 12 is fastened to the subframe 2A from the underside of the fuel tank 14 to subassemble a subframe module having the fuel tank 14. In the next step, the subframe module is mounted to the vehicle body. According to such an assembling method using the suspension module or the subframe module as a subassembly, the assembly efficiency can be improved and the mountability of the fuel tank can be improved.

Figure 8:
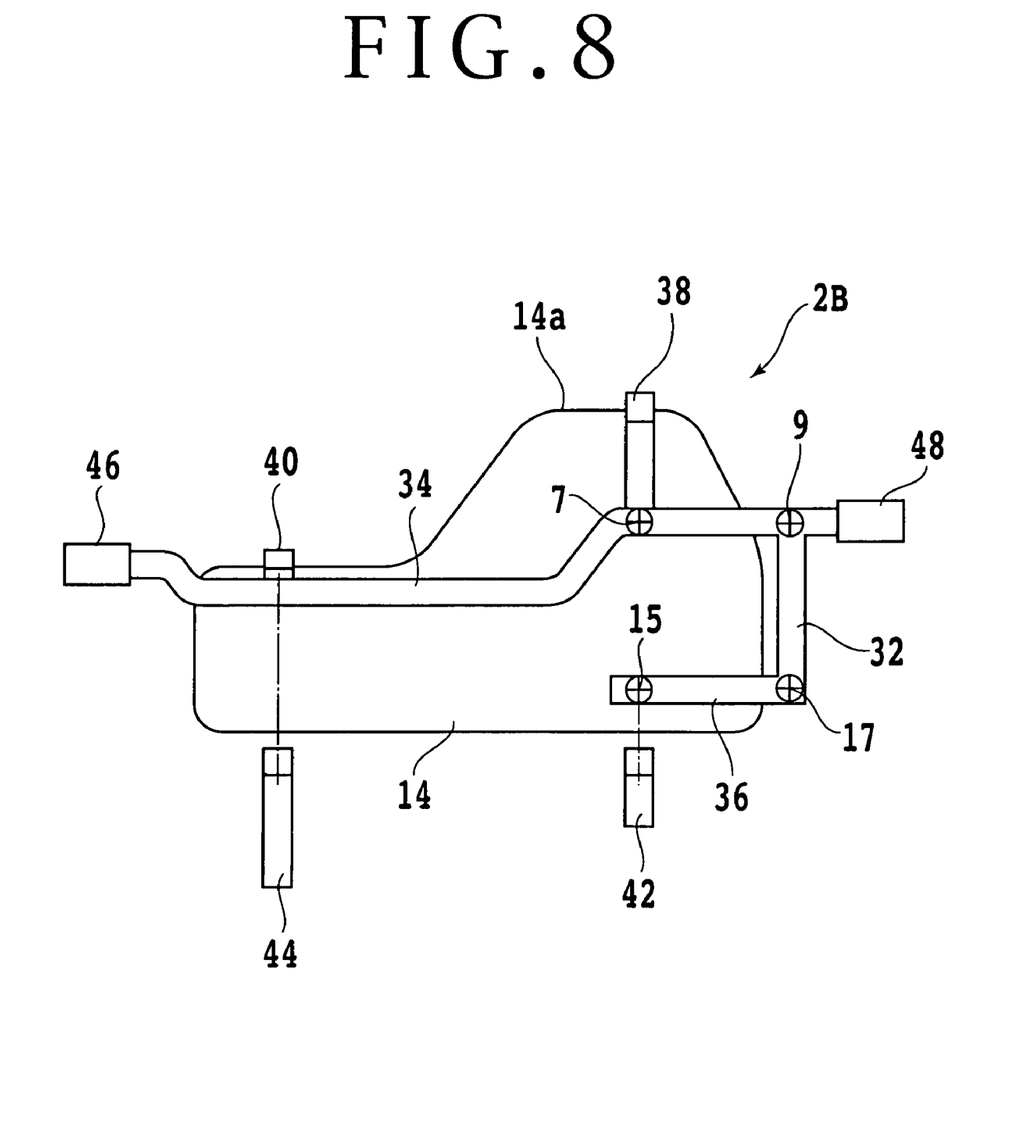
FIG. 8 is a schematic side view showing a supporting structure for a fuel tank according to a third preferred embodiment of the present invention.

Referring to FIG. 8, there is shown a schematic side view of a supporting structure for a fuel tank according to a third preferred embodiment of the present invention. A subframe 2B according to the third preferred embodiment includes a vertical member 32, an upper longitudinal member 34 integrally connected to the upper end of the vertical member 32, and a lower longitudinal member 36 integrally connected to the lower end of the vertical member 32. In this preferred embodiment, the upper longitudinal member 34 overlaps the fuel tank 14 over the length thereof in the longitudinal direction of the vehicle. However, it is sufficient that the upper longitudinal member 34 may overlap the fuel tank 14 over at least the half of the length thereof in the longitudinal direction of the vehicle. Reference symbols 7 and 9 denote points (brackets) for fixing the left upper arm of the rear suspension as mentioned previously in the first and second preferred embodiments. Similarly, reference symbols 15 and 17 denote points (brackets) for fixing the left lower arm of the rear suspension.

The upper surface of the fuel tank 14 is held by holding members 38 and 40 fastened to or integrally connected to the upper longitudinal member 34. The lower surface of the fuel tank 14 is supported by a first supporting member 42 detachably fastened to the lower longitudinal member 36 and a second supporting member 44 detachably fastened to the upper longitudinal member 34. Reference symbols 46 and 48 denote rubber mounts for mounting the subframe 2B to the vehicle body. The rubber mounts 46 and 48 function to cut off road noise and also to suppress the transmission of vibrations or noise generated from the fuel tank 14 directly to the vehicle body.

Also in this preferred embodiment, the fuel tank 14 can be solely removed by removing the first and second supporting members 42 and 44, and effects similar to those of the first and second preferred embodiments can be exhibited. In particular, the lower surface of the fuel tank 14 is supported by the first and second supporting members 42 and 44 according to the third preferred embodiment, so that a tank band required in the related art can be eliminated.

Figure 9:
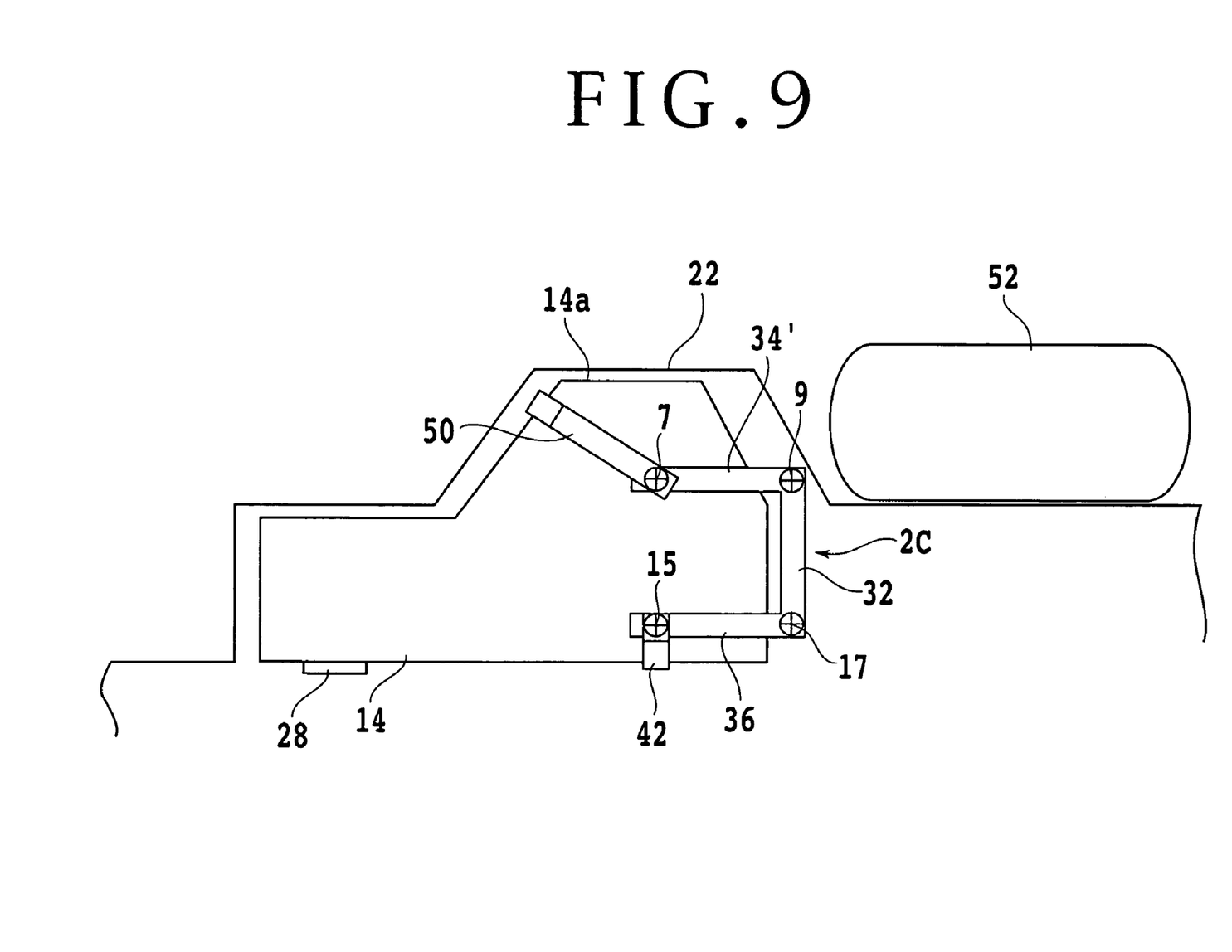
FIG. 9 is a schematic side view showing a supporting structure for a fuel tank according to a fourth preferred embodiment of the present invention.

Referring to FIG. 9, there is shown a schematic side view of a supporting structure for a fuel tank according to a fourth preferred embodiment of the present invention. A subframe 2C according to the fourth preferred embodiment includes a vertical member 32, an upper longitudinal member 34' integrally connected to the upper end of the vertical member 32, and a lower longitudinal member 36 integrally connected to the lower end of the vertical member 32. The fuel tank 14 is supported at its rear end portion by a supporting member 42 detachably fastened to the subframe 2C. The front end portion of the tank 14 is supported by a tank band 28 fixed to the vehicle body.

Further, a stopper member 50 connecting the upper arm fixing points 17 and 11 is engaged with the front surface of the volume expanded portion 14a of the fuel tank 14. The stopper member 50 functions to stop the frontward movement of the fuel tank 14 in the case of frontal collision of the vehicle.

Figure 10:
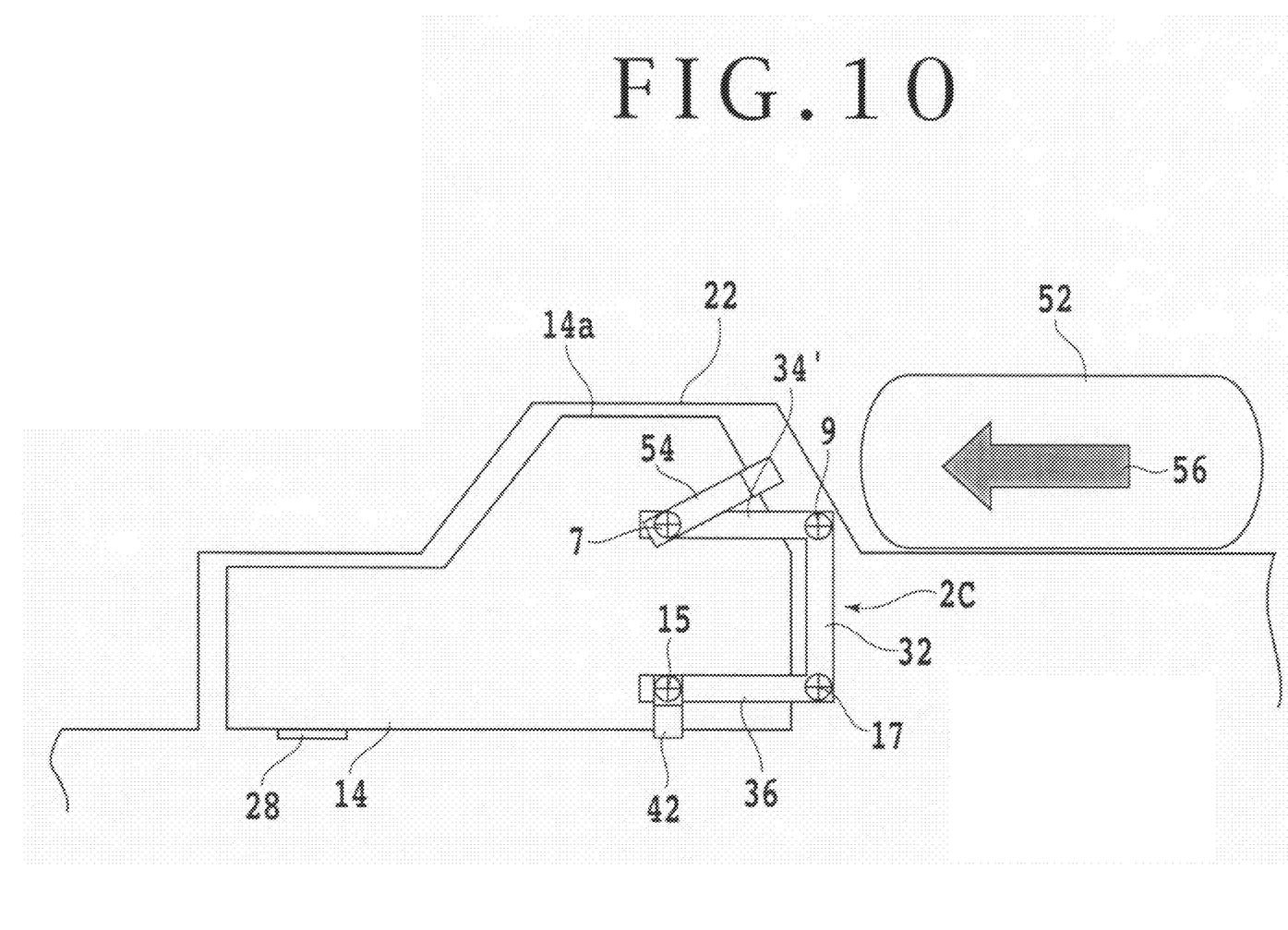
FIG. 10 is a schematic side view showing a supporting structure for a fuel tank according to a fifth preferred embodiment of the present invention.

Referring to FIG. 10, there is shown a schematic side view of a supporting structure for a fuel tank according to a fifth preferred embodiment of the present invention. The fifth preferred embodiment is different from the fourth preferred embodiment in only the point that a stopper member 54 connecting the upper arm fixing points 7 and 11 is engaged with the rear surface of the volume expanded portion 14a of the tank 14. In the case of frontal collision of the vehicle, the spare tire 52 may move frontward as shown by an arrow 56. However, the stopper member 54 functions to prevent the collision of the spare tire 52 with the fuel tank 14 through the floor 22.

Figure 11:
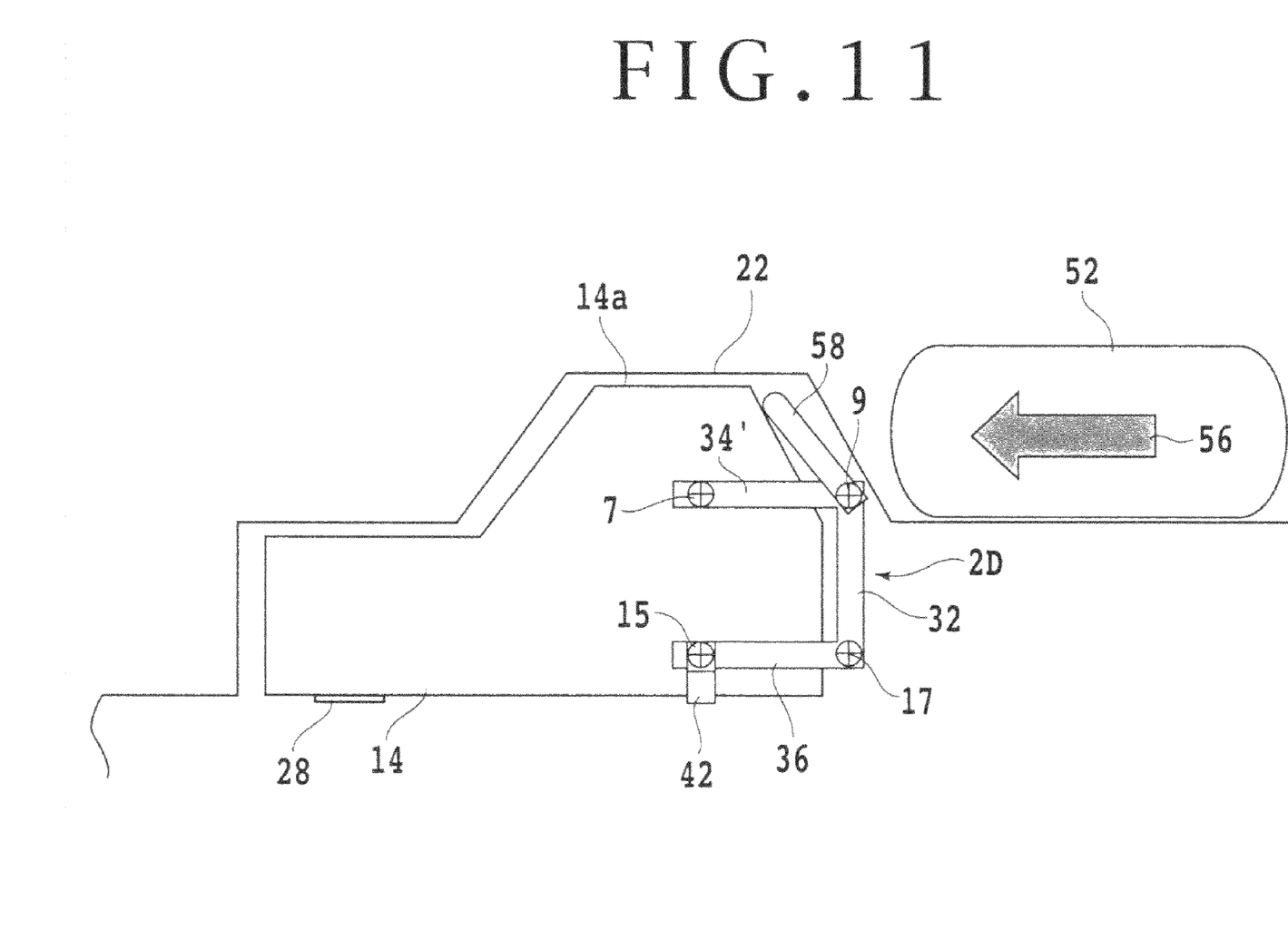
FIG. 11 is a schematic side view showing a supporting structure for a fuel tank according to a sixth preferred embodiment of the present invention.
Figure 12:
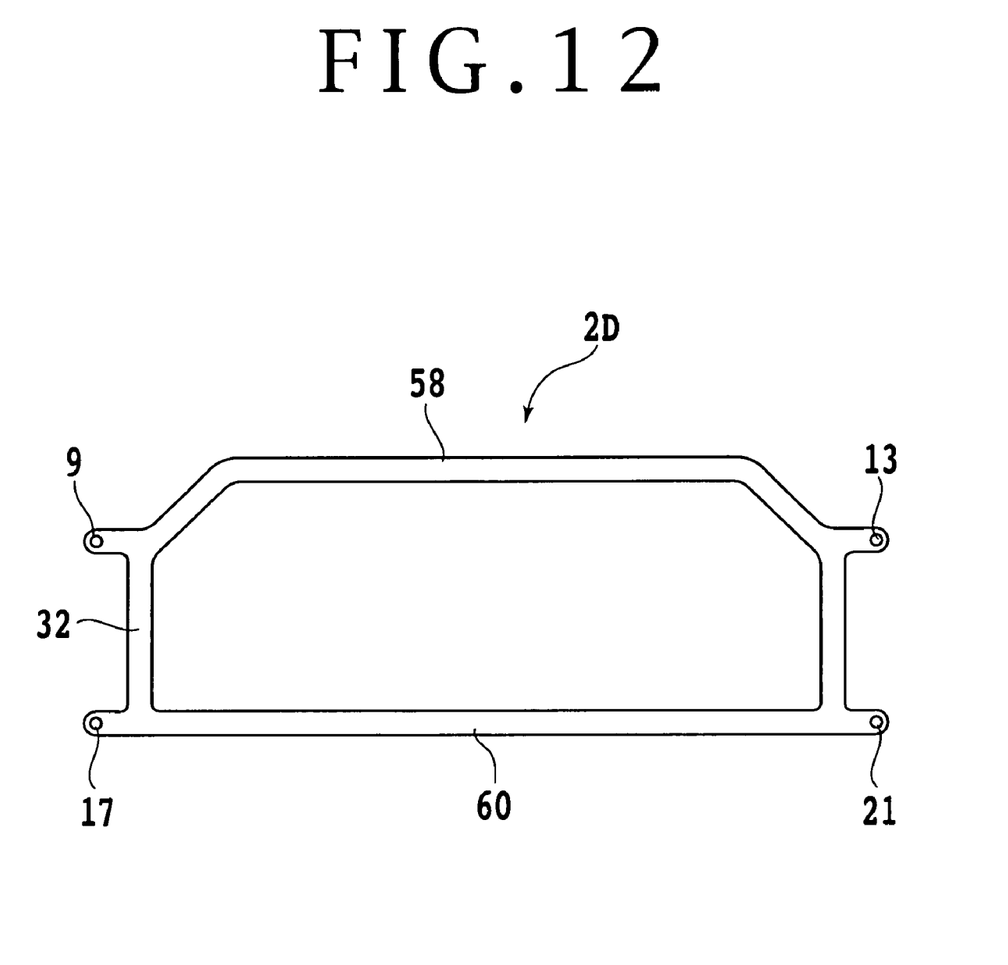
FIG. 12 is a rear elevation of a subframe shown in FIG. 11.

Referring to FIG. 11, there is shown a schematic side view of a supporting structure for a fuel tank according to a sixth preferred embodiment of the present invention as a modification of the fifth preferred embodiment. A subframe 2D according to the sixth preferred embodiment has a stopper member 58 connecting the upper arm fixing points 9 and 13. The stopper member 58 abuts against the rear surface of the volume expanded portion 14a of the fuel tank 14. As shown in FIG. 12, the subframe 2D has a lateral member 60 extending in the lateral direction of the vehicle. Also in this preferred embodiment, the stopper member 58 functions to prevent the collision of the spare tire 52 with the fuel tank 14 in the case of frontal collision of the vehicle.

Figure 13:
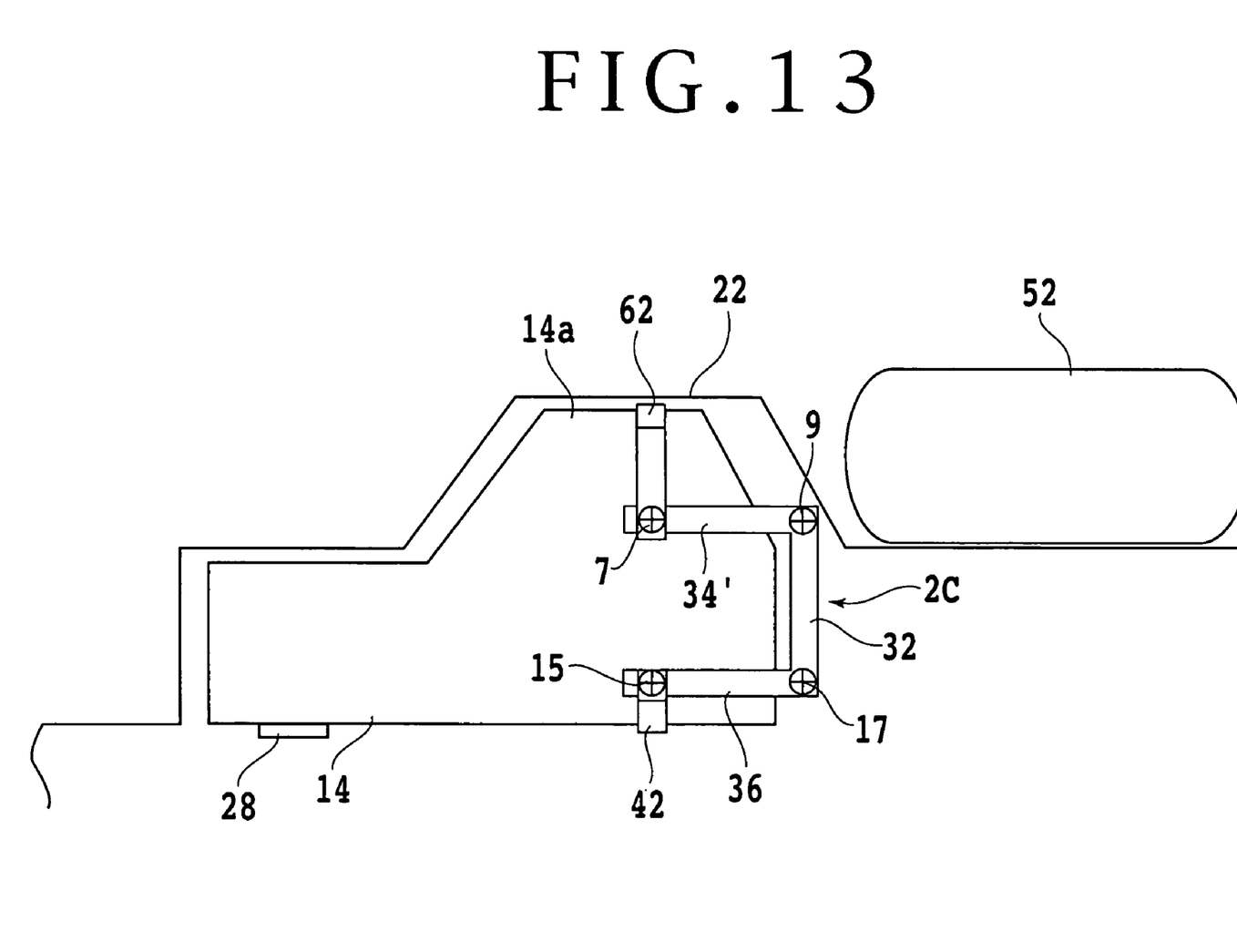
FIG. 13 is a schematic side view showing a supporting structure for a fuel tank according to a seventh preferred embodiment of the present invention.

Referring to FIG. 13, there is shown a schematic side view of a supporting structure for a fuel tank according to a seventh preferred embodiment of the present invention. In the seventh preferred embodiment, a supporting member 42 is detachably fastened to the lower arm fixing points 15 and 19, and a holding member 62 is fastened to the upper arm fixing points 7 and 11. According to this preferred embodiment, the fuel tank 14 can be constrained in the vertical direction by the supporting member 42 and the holding member 62 to obtain a subframe module, which can be mounted as a unit to the vehicle body. Thus, the mountability of the fuel tank 14 can be improved and the positioning accuracy of the fuel tank 14 can be improved.

The present invention is not limited to the details of the above described preferred embodiments. The scope of the invention is defined by the appended claims and all changes and modifications as fall within equivalence of the scope of the claims are therefore to be embraced by the invention.

What is claimed is:

1. A supporting structure for supporting a fuel tank in a vehicle, said supporting structure comprising:
    a suspension arm fixing structure provided under a floor of a vehicle body and having a statically sufficient rigidity;
    a fuel tank located proximate said suspension arm fixing structure in a longitudinal direction of said vehicle; and
    a tank supporting member provided under said fuel tank and arranged so as to extend in the lateral direction of said vehicle, said tank supporting member being detachably fastened to said suspension arm fixing structure to hold said fuel tank in cooperation with a part of said suspension arm fixing structure,
    said suspension arm fixing structure comprising a subframe including a vertical member, an upper longitudinal member integrally connected to an upper end of said vertical member, and a lower longitudinal member integrally connected to a lower end of said vertical member,
    said fuel tank having a volume expanded portion projecting upward,
    said supporting structure for a fuel tank further comprising:
        a stopper member connected to said upper longitudinal member and engaged with a front surface or a rear surface of said volume expanded portion of said fuel tank,
    said tank supporting member serving also as a reinforcing member for imparting rigidity to said suspension arm fixing structure so that said suspension arm fixing structure can sufficiently sustain a dynamic load during running of said vehicle.

2. The supporting structure for the fuel tank according to claim 1, wherein said subframe is formed independently of said vehicle body.

3. The supporting structure for the fuel tank according to claim 1, further comprising a tank band capable of fixing said fuel tank to said vehicle body statically.

4. The supporting structure for the fuel tank according to claim 1, wherein:
    said subframe is formed independently of said vehicle body, and
    said supporting structure further comprises a second tank supporting member detachably fastened to said subframe for securely supporting said fuel tank.

* * * * *